(12) United States Patent
Ochi et al.

(10) Patent No.: US 7,428,192 B2
(45) Date of Patent: Sep. 23, 2008

(54) OPTICAL PICKUP DEVICE AND OPTICAL DISK DEVICE USING IT

(75) Inventors: Manabu Ochi, Fujisawa (JP); Hiroshi Ogasawara, Yokohama (JP)

(73) Assignee: Hitachi Media Electronics Co., Ltd., Mizusawa-shi, Iwate-ken (JP)

( * ) Notice: Subject to any disclaimer, the term of this patent is extended or adjusted under 35 U.S.C. 154(b) by 561 days.

(21) Appl. No.: 10/902,393

(22) Filed: Jul. 28, 2004

(65) Prior Publication Data

US 2005/0249055 A1    Nov. 10, 2005

(30) Foreign Application Priority Data

May 7, 2004    (JP)    ............................... 2004-138032

(51) Int. Cl.
*G11B 7/00*    (2006.01)
(52) U.S. Cl. .................................... 369/44.14; 720/652
(58) Field of Classification Search ................. 720/652
See application file for complete search history.

(56) References Cited

U.S. PATENT DOCUMENTS 6,831,882 B1 * 12/2004 Takashima et al. ....... 369/44.14

2004/0047273 A1 * 3/2004 Kitano ....................... 369/121

FOREIGN PATENT DOCUMENTS

| JP | 2003-022555 | 1/2003 |
| JP | 2003-045059 | 2/2003 |
| WO | WO01/33562 | * 5/2001 |

* cited by examiner

*Primary Examiner*—Wayne Young
*Assistant Examiner*—Lixi Chow
(74) *Attorney, Agent, or Firm*—Townsend and Townsend and Crew LLP

(57) ABSTRACT

In an optical pickup device, heat conduction from a semiconductor laser to a pickup case is to be increased, thereby to prevent the semiconductor laser from deteriorating in performance, being reduced in durability and in committing erroneous actions, and to improve its reliability. An optical pickup device comprises a semiconductor laser for recording or playing back information onto or from an optical disk, a laser drive circuit to control the driving of the semiconductor laser, a pickup case for mounting the semiconductor laser and the laser drive circuit, and a signal transmitting flexible substrate for transmitting signals and the like to the semiconductor laser. To this optical pickup device is added a heat conducting flexible member for thermally connecting the semiconductor laser and the pickup case.

4 Claims, 9 Drawing Sheets

OPTICAL PICKUP DEVICE AND OPTICAL DISK DEVICE USING IT

CLAIM OF PRIORITY

The present application claims priority from Japanese application serial JP 2004-138032 filed on May 7, 2004, the content of which is hereby incorporated by reference into this application.

FIELD OF THE INVENTION

The present invention relates to an optical pickup device for playing back or recording information from or onto an optical disk and an optical disk device using it.

BACKGROUND OF THE INVENTION

A commonplace optical pickup device is composed of a semiconductor laser for emitting light on an optical disk, optical components for branching a beam from the semiconductor laser or focusing it on the optical disk, and an optical detector for receiving the reflected beam from the optical disk.

The optical pickup device is mounted with components which emit heat during recording or playback including a laser drive circuit, high frequency module, optical detector and objective lens drive coil in addition to the semiconductor laser. The temperature of the optical pickup device is raised by these heat emitting components.

In a recording type optical pickup device having a function to record information onto an optical disk such as a DVD-RAM/R/RW or CD-R/RW, the outputs of the semiconductor laser provided in the optical pickup device and of the laser drive circuit which drives the laser are greater relative to the output of the optical pick up device, and their heat emission is substantial. In this recording type optical pickup device, the higher the recording speed, the greater output the semiconductor laser requires and, moreover, the higher the heat emission. Especially, where the recording speed of the DVD is eightfold or even higher, in order to transmit high quality high frequency signals to the semiconductor laser, it is necessary to mount the laser drive circuit with a circuit for generating a recording signal waveform known as write strategy. This generating circuit is conventionally built into a circuit on a circuit board of the optical disk device, and the mounting of this generating circuit on the optical pickup device further increases the heat emitted from the laser drive circuit.

It is also required to arrange the semiconductor laser and the laser drive circuit close to each other to ensure a high level of transmission path performance. The arrangement of these heat emitting components in proximity to each other invites a further temperature rise in that area.

The heat emission described above involves the risk of deteriorating the performance, reducing the durability and inviting erroneous actions of such components as the semiconductor laser and the laser drive circuit.

On the other hand in an optical pickup device, high optical characteristics relating to the operating wavelength of CDs or DVDs are required. Especially in a single optical pickup device which can record information of both types of media, including CDs and DVDs, the requirement for high optical characteristics applies to the operating wavelengths of both CDs and DVDs. In order to meet these requirements, the semiconductor laser needs to be positioned with high accuracy and fixed in that position. To satisfy this need, when the semiconductor laser is fixed, it is not placed in close contact with the pickup case but at a distance of a few hundreds of μm to a few mm where its positional accuracy can be secured, and fixed in this highly accurately positioned state by filling. the gap between it and the pickup case with an adhesive. This results in the problem that the conduction of the heat generated by the semiconductor laser is obstructed by the adhesive, and the heat cannot be sufficiently conducted to the pickup case via fixing members.

As a solution to this heat emission problem, an optical pickup is proposed, for instance, in the Japanese Patent Laid-Open No. 2003-22555 (Patent Reference 1). According to this Patent Reference 1, there is disclosed an optical pickup equipped with a slide base movably supporting an integrated optical element provided with a light emitting element, wherein the integrated optical element is mounted on a flexible substrate for use as transmission path formed of a metallic or thermally. conductive material, and heat is conducted by keeping this transmission path flexible substrate in contact with the cover of the optical pickup and the slide base.

[Patent Reference 1] Japanese Patent Laid-Open No. 2003-22555, pp. 1-3, FIG. 1

In the aforementioned optical pickup according to Patent Reference 1, heat emitted from the integrated optical element is conducted to the cover and the slide base via the transmission path flexible substrate on which the integrated optical element is mounted, but it is still unable to achieve a sufficiently high level of heat conducting performance. Thus the transmission path flexible substrate according to Patent Reference 1 involves a problem. Namely, when heat conduction from the integrated optical element is needed, not only the substrate itself may also be electrified and emit heat to obstruct heat conduction from the integrated optical element to the cover and the slide base, but also, if any other heat emitting component is connected to the heat conduction side, the heat conduction performance of the integrated optical element will be deteriorated by the thermal influence of this additional heat source.

SUMMARY OF THE INVENTION

An object of the present invention therefore is to provide an optical pickup device and an optical disk device both excellent in reliability, in which heat conduction from the semiconductor laser to the pickup case is increased thereby to prevent the semi conductor laser from deteriorating in performance, being reduced in durability and committing erroneous actions.

In order to achieve the object stated above, an optical pickup device according to the invention has a configuration comprising: a semiconductor laser for emitting a laser beam for playing back or recording information from or onto an optical disk; a laser drive circuit for controlling the driving of the semiconductor laser; a pickup case to be mounted with the semiconductor laser and the laser drive circuit; and a signal transmitting flexible substrate for transmitting signals and the like to the semiconductor laser, wherein a heat conducting flexible substrate for thermo-conductively connecting the semiconductor laser and the pickup case is also provided.

Preferred specific examples of the optical pickup device according to the invention include the following.

(1) The heat conducting flexible member is formed by adding a heat conducting flexible substrate extending from the signal transmitting flexible substrate.

(2) One end of the wiring pattern of the heat conducting flexible substrate is electrically and thermally connected to the grounding terminal of the semiconductor laser, and the other end of the wiring pattern is electrically and thermally connected to the pickup case.

(3) The semiconductor laser and the laser drive circuit are mounted on the pickup case, arranged close to each other and connected via the signal transmitting flexible substrate, and the heat conducting flexible substrate is extended from the signal transmitting flexible substrate in the, direction reverse to the laser drive circuit and thermally connected to the pickup case.

(4) The length, width and thickness of the wiring pattern of the heat conducting flexible substrate are respectively represented by L, w and t; the area of its contact with the pickup case by S; the thermal conductivity of the heat conducting flexible substrate by $\lambda$; the thermal conductivity on the surface of the heat conducting flexible substrate by h; the temperature of the grounding terminal of the semiconductor laser by $T_o$; the temperature at the connecting point between the wiring pattern of the heat conducting flexible substrate and the pickup case by $T_l$; the ambient air temperature of the optical pickup device by $T_a$; and the ratio of the difference between the temperature $T_o$ and the temperature $T_l$ to the difference between the temperature $T_o$ and the temperature $T_a$ by k, the length L of the wiring pattern is within the range expressed by the following Formula (1).

$$\frac{\left[1 + \frac{kS}{d}\sqrt{\frac{\lambda}{2hwt(w+t)}}\tanh\left[L\sqrt{\frac{2h(w+t)}{\lambda wt}}\right]\right]\tanh\left[L\sqrt{\frac{2h(w+t)}{\lambda wt}}\right]}{\tanh\left[L\sqrt{\frac{2h(w+t)}{\lambda wt}}\right] + \frac{kS}{d}\sqrt{\frac{\lambda}{2hwt(w+t)}}} \leq 0.5 \qquad [\text{Formula 1}]$$

(5) The wiring pattern of the heat conducting flexible substrate is formed in multiple layers, one side of that multilayered wiring pattern being thermally connected to the semiconductor laser and the other side of that multilayered wiring pattern being thermally connected to the pickup case.

(6) The heat conducting flexible member is branched into a plurality of parts, and the branched parts are thermally connected to different positions in the pickup case.

(7) The semiconductor laser and the laser drive circuit are arranged close to each other, and the flexible member extends from the semiconductor laser in the direction reverse to the laser drive circuit and is thermally connected to the pickup case.

(8) The heat conducting flexible member is formed of a plurality of wires.

In order to achieve the object stated above, an optical disk device according to the present invention comprises a spindle motor for turning an optical disk, a body drive circuit for controlling the driving of the spindle motor, an optical pickup device for playing back information from the optical disk or recording information onto the optical disk, and a body case for accommodating these elements, wherein the optical pickup device is provided with a semiconductor laser for emitting a laser beam to play back information from the optical disk or record information onto the optical disk, a laser drive circuit for controlling the driving of the semiconductor laser, and a pickup case for mounting the semiconductor laser and the laser drive circuit, and a heat conducting flexible member for thermo-conductively connecting the semiconductor laser and the pickup case.

Preferred specific examples of the optical disk device according to the invention include the following.

(1) The heat conducting flexible member is formed by adding a heat conducting flexible substrate extending from the signal transmitting flexible substrate.

(2) One end of the wiring pattern of the heat conducting flexible substrate is electrically and thermally connected to the grounding terminal of the semiconductor laser, and the other end of the wiring pattern is electrically and thermally connected to the pickup case.

(3) The heat conducting flexible member is branched into a plurality of parts, and the branched parts are thermally connected to different positions in the pickup case.

According to the invention, as a heat conducting flexible member to thermo-conductively connect the semiconductor laser and the pickup case is additionally provided, the influence of the signal transmitting flexible substrate's own heat conduction from the semiconductor laser to the pickup case can be eliminated, and heat conduction from the semiconductor laser to the pick up case can be increased. It is there by made possible to restrain the temperature rise of the semiconductor laser to prevent the laser from deteriorating in performance, being reduced in durability and committing erroneous actions, resulting in an optical pickup device and an optical disk device both excellent in reliability.

In a preferred specific example of the invention, since the heat conducting flexible member is formed of a heat conducting flexible substrate added by extending the signal transmitting flexible substrate, the fabrication and assembly of the signal transmitting flexible substrate and the heat conducting flexible substrate can be accomplished with remarkable ease, resulting in much reduced costs. At the same time, since the heat conducting flexible substrate and the signal transmitting flexible substrate are arranged on both sides of the semiconductor laser, the loads on the two substrates can be well balanced, thereby to restrain the semiconductor laser from deviating in position.

In another preferable specific example of the invention, as one side of the wiring pattern of the heat conducting flexible substrate is electrically and thermally connected to the grounding terminal of the semiconductor laser and the other side of the multilayered wiring pattern is electrically and thermally connected to the pickup case, the grounding of the semiconductor laser can be strengthened, resulting in satisfactory electrical characteristics and at the same time a saving in cost because the wiring pattern of the heat conducting flexible substrate can be used in common for grounding and heat conducting purposes.

In another preferable specific example of the invention, as the semiconductor laser and the laser drive circuit are arranged close to each other on the pickup case and connected via the signal transmitting flexible substrate, the pickup case can be made more compact, and the transmission path characteristics improved. Moreover, as the heat conducting flexible substrate extends from the signal transmitting flexible substrate in the direction reverse to the laser drive circuit and is thermally connected to the pickup case, the semiconductor laser and the laser drive circuit do not obstruct heat conduction from each other, with the result that any temperature rise in the semiconductor laser and the laser drive circuit can be restrained securely.

In another preferable specific example of the invention, as the length L of the wiring pattern is kept within the above-cited Formula (1), any temperature rise in the semiconductor laser can be restrained even more securely.

In another preferable specific example of the invention, as the wiring pattern of the heat conducting flexible substrate is formed in multiple layers, one side of that multilayered wiring pattern is thermally connected to said semiconductor laser and the other side of that multilayered wiring pattern is thermally connected to said pickup case, it is made possible to expand the heat conducting sectional area of the wiring pattern to further restrain the temperature rise in the semiconductor laser, increase the flexibility of the heat conducting flexible substrate, and reduce the load of the heat conducting flexible substrate working on the semiconductor laser. This load reduction makes it possible to prevent the semiconductor laser from deviating in position, fix it more firmly and thereby improve its optical characteristics. At the same time, it is made possible to connect the wiring pattern of the heat conducting flexible substrate and the pickup case in the vicinity of the semiconductor laser, resulting in improved efficiency of heat conduction from the semiconductor laser to the pickup case.

In another preferable specific example of the invention, because the heat conducting flexible member is branched into a plurality of parts, and the branched parts are thermally connected to different positions in the pickup case, the performance of heat conduction to the pickup case can be improved while securing a sufficient heat conducting sectional area of the heat conducting flexible member, thereby enabling the temperature rise of the semiconductor laser to be restrained reliably.

In another preferable specific example of the invention, since the semiconductor laser and the laser drive circuit are arranged close to each other, and the flexible member extends from the semiconductor laser in the direction reverse to the laser drive circuit and is thermally connected to the pickup case, the pickup case can be made compact, and heat can be conducted into a part of the pickup case less susceptible to the thermal influence of the laser drive circuit, making it possible to securely restrain any temperature rise of the semiconductor laser.

In another preferable specific example of the invention, as the heat conducting flexible member is formed of a plurality of wires, not only can the sectional area of heat conduction be expanded with inexpensive wires but also can the flexibility of the heat conducting flexible member formed of the wires be increased.

DESCRIPTION OF THE PREFERRED EMBODIMENTS OF THE INVENTION

A plurality of preferred embodiments of the present invention will be described below with reference to the accompanying drawings. The same reference signs in the illustrations of different embodiments denote the same or equivalent elements. By appropriately combining two or more of these embodiments as required, the invention can be implemented more effectively. The invention is not limited to the modes disclosed in the preferred embodiments thereof, but permits modifications based on known art or the like.

A first preferred embodiment of the present invention will be described below with reference to FIG. 1 through FIG. 6.

Figure 1:
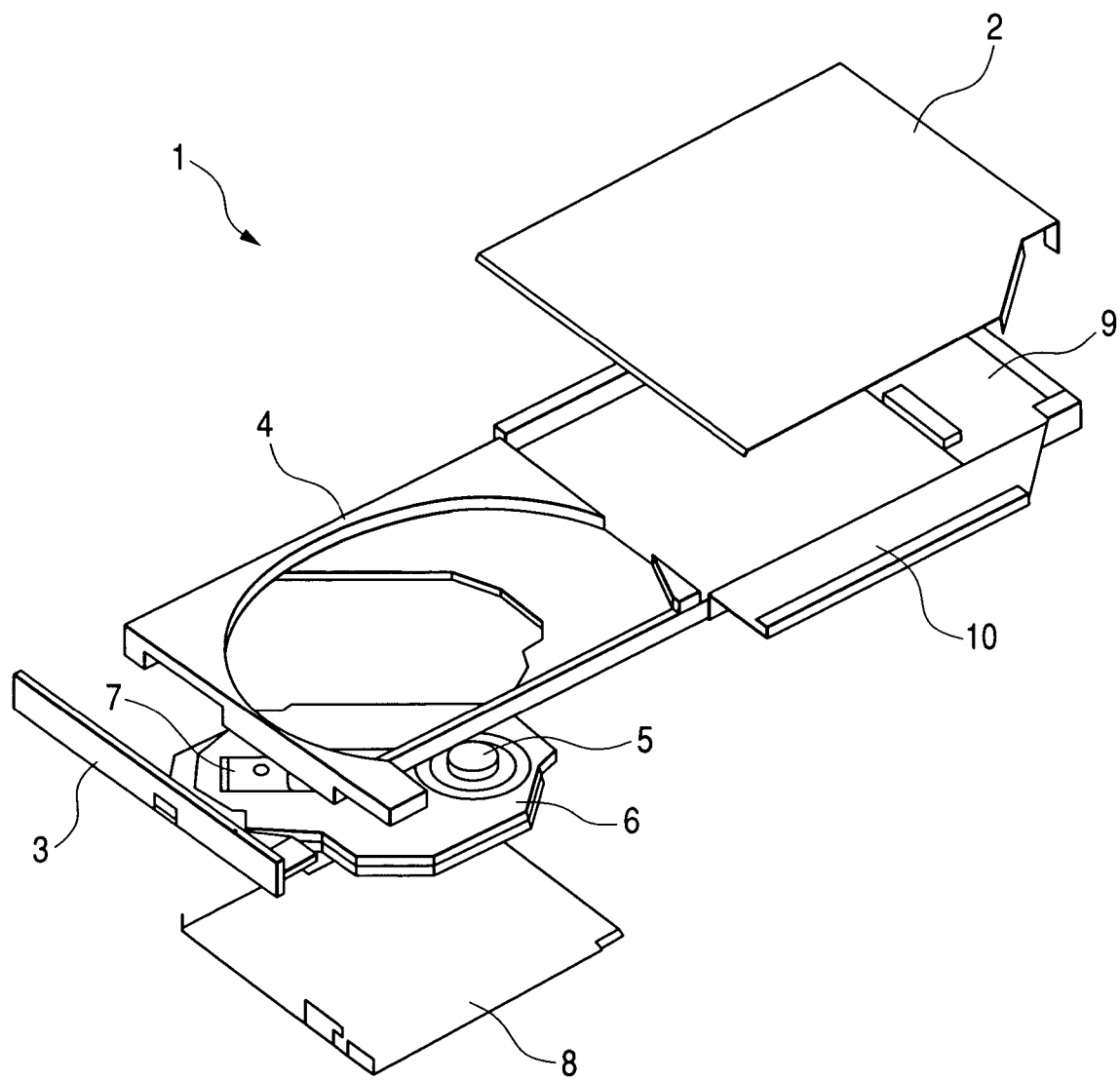
FIG. 1 is an exploded perspective view of an optical disk device which is a first preferred embodiment of the present invention.

First, an overall description of the optical disk device of this embodiment will be given with reference to FIG. 1. FIG. 1 shows an exploded perspective view of an optical disk device which is the first preferred embodiment of the invention.

An optical disk device 1 is mainly composed of a bottom case 10, a disk tray 4 for bringing an optical disk, which is an information recording medium, into or out of the device, and a circuit board 9 mounted with semiconductor components for performing drive control over electronic components mounted within the disk device and signal processing. The top and front faces of the bottom case 10 are covered by a top case 2 and a front panel 3, respectively.

The disk tray 4 is fitted with a unit mechanism 6, and its under face is shielded by a bottom cover 8. The unit mechanism 6 is mounted with a spindle motor 5 for turning the optical disk, a recording/playback or playback-only optical pickup device 7 for recording or playing back information onto or from the optical disk, and an optical pickup feed mechanism for moving the optical pickup device 7 in the radial direction of the optical disk along a guide shaft.

Figure 2:
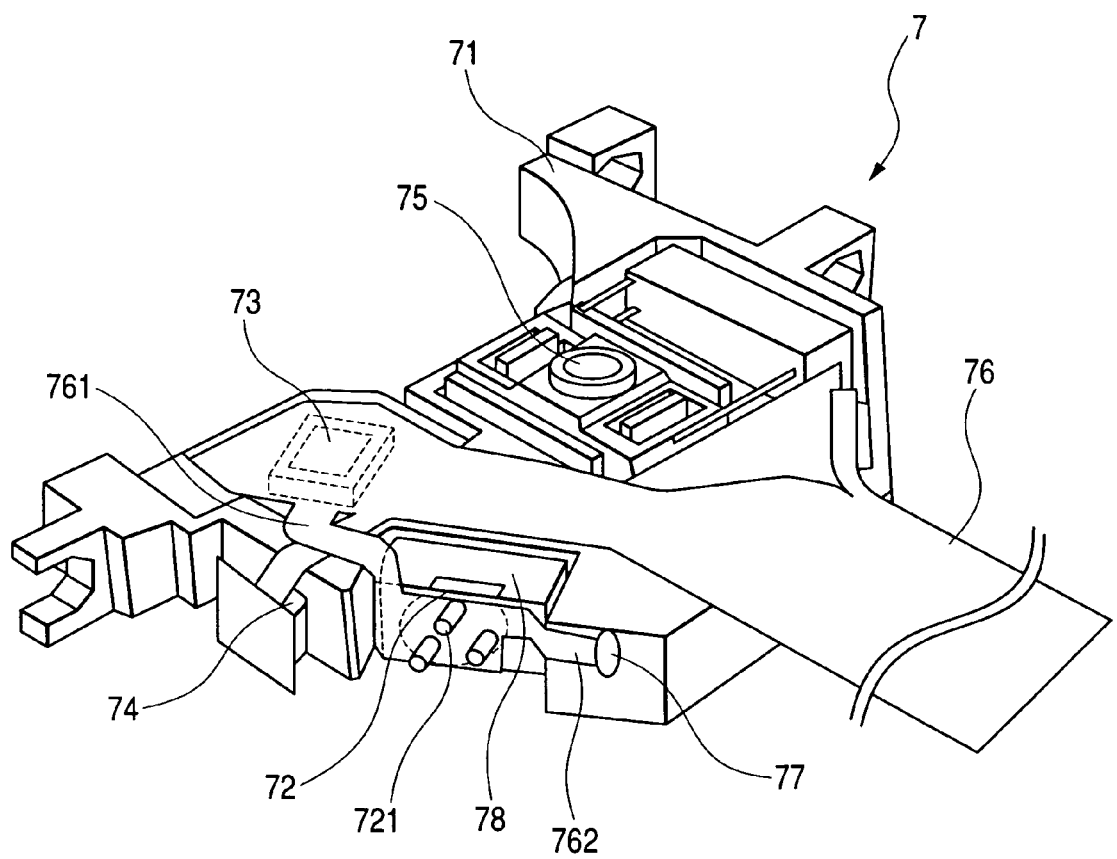
FIG. 2 is a perspective view of an optical pickup device for use in the optical disk device of FIG. 1.

Next will be described more details of the optical pickup device 7 with reference to FIG. 2. FIG. 2 shows a perspective view of the optical pickup device 7 for use in the optical disk device 1 of FIG. 1.

The optical pickup device 7, provided for recording or playing back information onto or from the optical disk, is configured of a semiconductor laser 72, a laser drive circuit 73, a front monitor (not shown), an optical component (not shown), an objective lens drive unit, an optical detector, a flexible substrate 76, and a metallic pickup case 71 for mounting these elements.

The semiconductor laser 72, which emits a laser beam for recording or playing back information onto or from the optical disk, has a grounding terminal 721, a plus terminal 722 and another terminal 723 protruding therefrom. The laser drive circuit 73 controls the driving of the semiconductor laser 72. The laser drive circuit 73 is composed of a laser drive IC. The optical component, provided for monitoring the output of the semiconductor laser 72, comprises a front monitor, and a prism, mirror, and lens for guiding the laser beam toward the optical disk. The objective lens drive unit 75 is equipped with an objective lens for focusing the laser beam accurately on a prescribed position on the information recording side of the optical disk. The optical detector 74 is provided for converting the reflected beam from the optical disk into electric signals.

The flexible substrate 76 comprises a signal transmitting flexible substrate 763 for connecting the circuit board 9 and electronic components mounted on the optical pickup device 7 to enable signals to be inputted and outputted, and a heat conducting flexible substrate 762 for conducting the heat emitted from the semiconductor laser 72 to the pickup case 71. The heat conducting flexible substrate 762 extends from a signal transmitting flexible substrate 761 and is integrated with the signal transmitting flexible substrate 761.

The pickup case 71 comprises a pickup case body 711 shown in FIG. 2 and a metallic pickup case cover (not shown) shielding the top and bottom faces of this case body. The pickup case cover is used for holding down the flexible substrate 76 or keeping electromagnetic waves off the electronic components.

Among the components mounted on the optical pickup device 7, the components emitting heat in the recording or playback process include a drive coil fitted to the objective lens drive unit 75, the semiconductor laser 72, the laser drive circuit 73, the front monitor and the optical detector 74. Out of these components, the semiconductor laser 72 and the laser drive circuit 73 are arranged close to each other to ensure adequate transmission path performance. This close arrangement also contributes to making the pickup case 71 compact. Furthermore, this laser drive circuit 73 is mounted with a circuit for generating a recording signal waveform known as write strategy to enable high quality high frequency signals to be transmitted to the semiconductor laser 72.

Figure 3:
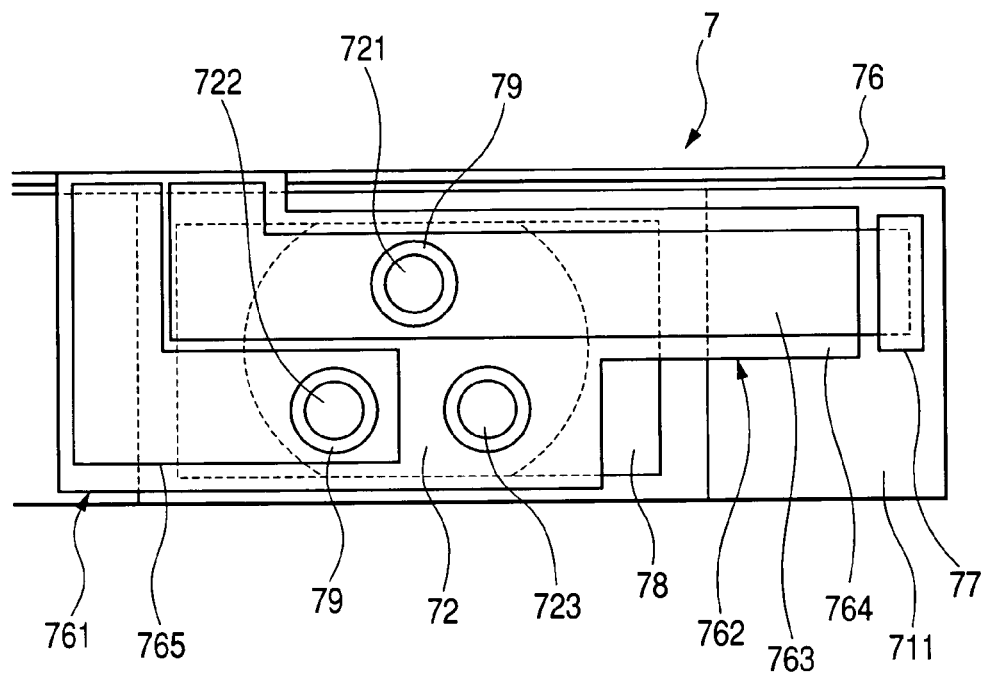
FIG. 3 is a front view of the semiconductor laser unit of the optical pickup device shown in FIG. 2.

Next will be described the fitting structure and heat conduction route of the semiconductor laser 72 with reference to FIG. 2 through FIG. 4. FIG. 3 shows a front view of the semiconductor laser unit 72 of the optical pickup device 7 shown in FIG. 2, and FIG. 4, a section of the essential part of FIG. 3. In FIG. 3, the wiring pattern in the signal transmitting flexible substrate and the heat conducting flexible substrate is shown in solid lines to make it more readily understandable.

As shown in FIG. 2, the semiconductor laser 72 is pressed into or brought into face contact with the concave portion of a metallic laser holder 78 and fixed there with an adhesive. Then, the position and angle of the semiconductor laser 72 are adjusted and, in a state in which the semiconductor laser 72 is positioned with high accuracy, the laser holder 78 is fixed in the concave portion of the pick up case body 711 with an adhesive in between. Since the semiconductor laser 72 is adjusted in this way, the laser holder 78 is not necessarily fixed in contact with the pickup case body 711, but is fixed to it with the adhesive in-between at a distance of a few hundred µm to a few mm. Therefore, heat conduction from the semiconductor laser 72 to the pickup case body 711 via the laser holder 78 is obstructed by the adhesive.

Figure 4:
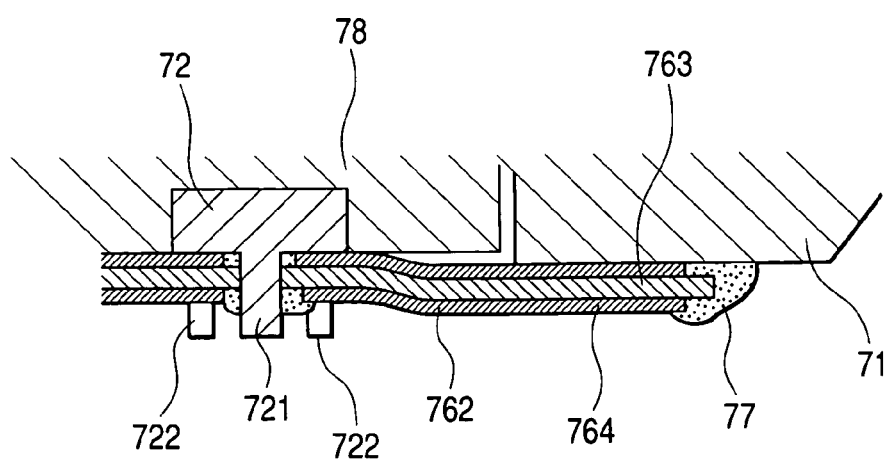
FIG. 4 is a section of the essential part of FIG. 3.

This embodiment, as shown in FIG. 2 through FIG. 4, is augmented with the heat conducting flexible substrate 762 which is a flexible member for heat conduction purpose and connects the semiconductor laser 72 and the pickup case 71 thermo-conductively. In other words, the grounding terminal 721 of the semiconductor laser 72 and the pickup case body 711 are thermo-conductively connected by the wiring pattern 763 of the heat conducting flexible substrate 762. In more specific terms, the grounding terminal 721 and the wiring pattern 763 are connected by solder 79, and the wiring pattern 763 and the pickup casebody 711 are connected by an electro conductive member 77. Therefore, the grounding terminal 721 and the pickup case body 711 are connected to keep electric conductivity and thermal conductivity without having the film 764 of the heat conducting flexible substrate 762 in-between. As the electroconductive member 77 here, silver paste may be used for instance. Further, the wiring pattern 763 of the heat conducting flexible substrate 762 is disposed to be thermally separate from the wiring pattern 765 of the signal transmitting flexible substrate 761.

This configuration makes it possible to conduct the heat emitted from the semiconductor laser 72 from the grounding terminal 721 to the pickup case body 711 via the wiring pattern 763 of the heat conducting flexible substrate 762, and conduct the heat through the pickup case body 711. Thus there is laid a heat transferring route consisting of the wiring pattern 763, whose thermal conductivity is a few hundred W/m/K, from the semiconductor laser 72, which is a heat emitting component, to the pickup case body 711.

The thermal resistance of this heat conducting route can be kept lower than that of a heat conducting route consisting of an adhesive of a few W/m/K in thermal conductivity, such as silicone resin, filling the gap between the laser holder 78 and the pickup case body 711 and letting the heat emitted from the semiconductor laser 72 to be transferred to the pickup case body 711 via the laser holder 78 and the silicone resin. Accordingly, the temperature rise of the semiconductor laser 72 can be kept small.

Furthermore, the rigidity of the heat conducting flexible substrate 762 in a direction vertical to its plane is weak. As the load working on the semiconductor laser 72 can be reduced accordingly, the positional deviation of the semiconductor laser can be restrained, and the optical characteristics can be thereby prevented from deterioration. Also, as the heat conducting flexible substrate. 762 is integrally disposed with the signal transmitting flexible substrate 761, there is no extra number of components or of assembling man-hours involved, making it possible to keep the component cost correspondingly low. Moreover, since the grounding terminal 721 of the semiconductor laser 72 and the pickup case body 711 are connected to keep electrical conductivity between them, the grounding of the semiconductor laser 72 can be strengthened, resulting in satisfactory electrical characteristics.

Figure 5:
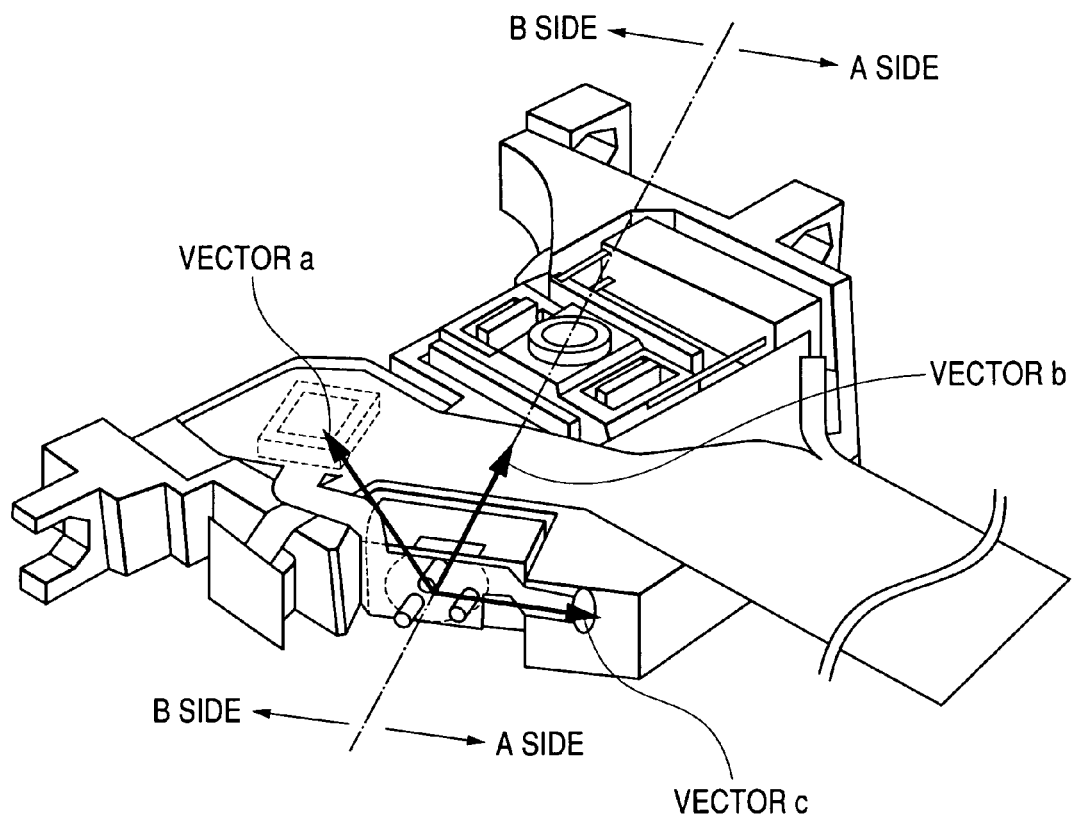
FIG. 5 is a view illustrating the relationship between the position of connecting the heat conducting flexible substrate to the optical pickup case and the position of the laser drive circuit in the optical disk device of FIG. 1.
Figure 6:
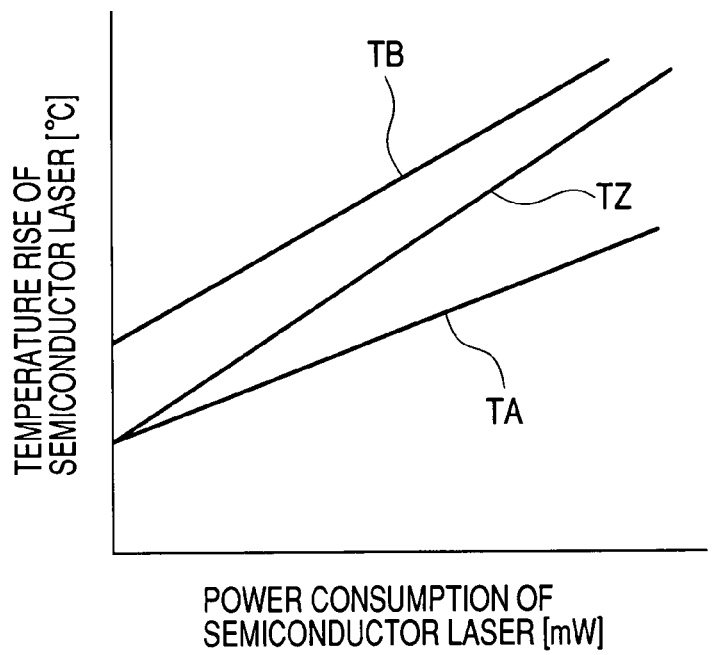
FIG. 6 is a graph comparing differences in the power consumption of a semiconductor laser 72 and the temperature rise of the semiconductor laser 72 depending on the position of connection between a heat conducting flexible substrate 762 and an optical pickup case 71.

Next will be described the connecting position between the wiring pattern 763 of the heat conducting flexible substrate 762 and the pickup case body 711 with reference to FIG. 5 and FIG. 6. FIG. 5 illustrates the relationship between the position of connecting the heat conducting flexible substrate 762 to the optical pickup case 71 and the position of the laser drive circuit 73 in the optical disk device 7 of FIG. 1. FIG. 6 compares differences in the power consumption of the semiconductor laser 72 and the temperature rise of the semiconductor laser 72 depending on the position of connection between the heat conducting flexible substrate 762 and the optical pickup case 71.

In FIG. 5, the vector having, as its starting point, the heat emission center of the semiconductor laser 72 and extending toward the heat emission center of the laser drive circuit 73 is represented by a. The vector having, as its starting point, the heat emission center of the semiconductor laser 72 and extending in parallel to the optical axis of the laser beam of the semiconductor laser 72 and in the projecting direction of the laser beam is represented by b. The vector having, as its starting point, the heat emission center of the semiconductor laser 72 and extending toward the connecting position between the wiring pattern 763 of the heat conducting flexible substrate 762 and the pickup case body 711 is represented by c. In this embodiment, the connecting position between the wiring pattern 763 of the heat conducting flexible substrate 762 and the pickup case body 711 is so set that the angle formed by the vector a and the vector c be greater than that formed between the vector a and the vector b and the angle formed by the vector a and the vector c be greater than that formed between the vector b and the vector c (A side with respect to the one-dot chain line in FIG. 5).

In FIG. 6, the horizontal axis represents the power consumption of the semiconductor laser 72, and the vertical axis, the temperature rise of the semiconductor laser 72. TZ represents the temperature rise characteristic of the semiconductor laser 72 in the absence of the wiring pattern 763 of the heat conducting flexible substrate 762; TA, the temperature rise characteristic of the semiconductor laser 72 when the connected and fixed position of the wiring pattern 763 of the heat conducting flexible substrate 762 and the pickup case body 711 is on the A side in FIG. 5; and TB, the temperature rise characteristic of the semiconductor laser 72 when the connected and fixed position of the wiring pattern 763 of the heat conducting flexible substrate 762 and the pickup case body 711 is on the B side in FIG. 5. The temperature rise of the semiconductor laser 72 is defined by (the temperature rise of the semiconductor laser 72)=(the temperature of the semiconductor laser 72)−(the ambient temperature of the optical pickup device 7).

The intersection points between the characteristics TZ, TA and TB and the vertical axis in FIG. 6 (i.e. the temperature rise relative to the power consumption of the semiconductor laser 72) indicate the influences of other heat emitting components than the semiconductor laser 72, such as the laser drive circuit 73, on the semiconductor laser 72. The lower the level of this temperature rise, the smaller the influence. As is evident from FIG. 6, where the connecting position between the wiring pattern 763 of the heat conducting flexible substrate 762 and the pickup case body 711 is disposed on the B side in FIG. 5, heat emitted from the laser drive circuit 73 raises the temperature of the pickup case body 711 on the B side in FIG. 5. As a consequence, no sufficient heat transfer from the semiconductor laser 72 to the B side of the pickup case body 711 can be secured. Furthermore, when much heat is emitted from the laser drive circuit 73, the heat of the laser drive circuit 73 may be conducted to the semiconductor laser 72 via the wiring pattern 763 and raise the temperature of the semiconductor laser 72.

On the other hand, the disposition of the connecting position between the wiring pattern 763 of the heat conducting flexible substrate 762 and the pickup case body 711 on the A side in FIG. 5 as in this embodiment prevents any heat transfer route from being established between the laser drive circuit 73 and the semiconductor laser 72, and accordingly prevents heat emission by the laser drive circuit 73 from raising the temperature of the semiconductor laser 72. Furthermore, as the impact of heat emission by the laser drive circuit 73 on the A side of the pickup case body 711 is smaller than on the B side of the pick up case body 711 because of the greater distance, and the temperature on the A side of the pickup case body 711 can be kept substantially low. Therefore, a sufficient heat transfer from the semiconductor laser 72 to the A side of the pickup case body 711 can be secured, and the temperature of the semiconductor laser 72 can be kept sufficiently low.

When the connecting position between the wiring pattern 763 of the heat conducting flexible substrate 762 and the pickup case body 711 is disposed on the A side in FIG. 5 as in this embodiment, the signal transmitting flexible substrate 761 linking this heat conducting flexible substrate 762, the semiconductor laser, and the laser drive circuit 73 is arranged in the reverse direction to the semiconductor laser 72 in the terminal section of the semiconductor laser 72. As a result, the heat conducting flexible substrate 762 serves to balance stresses working on the semiconductor laser 72, and thereby restrains the positional deviation of the semiconductor laser 72. Therefore, the semiconductor laser 72 can be prevented from deteriorating in optical characteristics.

Next will be discussed the length of the wiring pattern 763 of the heat conducting flexible substrate 762 disposed from the grounding terminal 721 of the semiconductor laser 72.

The length, width and thickness of the wiring pattern 763 of the heat conducting flexible substrate 762 disposed between the grounding terminal 721 of the semiconductor laser 72 to the pickup case body 711 are respectively represented by L, w and t, and the area of its contact with the pickup case 71 by S. The thermal conductivity of the heat conducting flexible substrate 762 is represented by λ, and the heat transfer coefficient on the surface of the heat conducting flexible substrate 762, by h. Then, the temperature of the grounding terminal 721 of the semiconductor laser 72 is represented by $T_o$; the temperature at the connecting point between the wiring pattern 763 of the heat conducting flexible substrate 762 and the pickup case body 711, by $T_j$; the ambient air temperature of the optical pickup device 7, by $T_a$; and the ratio of the difference between the temperature $T_o$ and the temperature $T_j$ to the difference between the temperature $T_o$ and the temperature $T_a$, by k. Then, when the heat conducting flexible substrate 762 provided from the grounding terminal 721 of the semiconductor laser for heat conduction is not connected to the pickup case body 711 and instead used as a heat sink, the calorific value $Q_1$ transmitted to the heat conducting flexible substrate 762, out of the heat emitted from the semiconductor laser 72, is expressed by the following Formula (2).

$$Q_1 = (T_o - T_a)\sqrt{2h\lambda wt(w+t)} \tanh\left[L\sqrt{\frac{2h(w+t)}{\lambda wt}}\right]$$ [Formula 2]

The calorific value $Q_2$ transmitted to the heat conducting flexible substrate 762, out of the heat emitted from the semiconductor laser 72 in the configuration of this embodiment is expressed in the following Formula (3).

$$Q_2 = (T_o - T_a)\sqrt{2h\lambda wt(w+t)}\ \frac{\tanh\left[L\sqrt{\frac{2h(w+t)}{\lambda wt}}\right] + \frac{kS}{d}\sqrt{\frac{\lambda}{2hwt(w+t)}}}{1 + \frac{kS}{d}\sqrt{\frac{\lambda}{2hwt(w+t)}}\tanh\left[L\sqrt{\frac{2h(w+t)}{\lambda wt}}\right]}$$ [Formula 3]

When the values of L in the two Formulas 1 and 2 are raised, the difference between the calorific value $Q_1$ and the calorific value $Q_2$ gradually narrows, and eventually they come close to the same value. In other words, when the length L of the wiring pattern 763 of the heat conducting flexible substrate 762 is increased, most of the calorific value transmitted from the semiconductor laser 72 to the heat conducting flexible substrate 762 is deprived from the surface of the heat conducting flexible substrate 762, but not transmitted to the pickup case body 711. Therefore in this embodiment, the length L of the wiring pattern 763 of the heat conducting flexible substrate 762 is kept within the range in which the condition represented by the following Formula (4) can be satisfied.

$$\frac{Q_2 - Q_1}{Q_2} \geq 0.5$$ [Formula 4]

As this enables the heat emitted from the semiconductor laser 72 to be efficiently transferred to the pickup case body 711 via the wiring pattern 763 of the heat conducting flexible substrate 762, the temperature of the semiconductor laser 72 can be kept sufficiently low. Therefore, the device can meet the high laser output requirement of recording on an optical disk and the requirement for high speed recording.

Next will be described second through ninth embodiments of the present invention with reference to FIG. 7 through FIG. 14. FIG. 7 through FIG. 14 show front views of the semiconductor laser units of the optical pickup devices of optical disk devices of the respective embodiments. These second through ninth embodiment differ from the first embodiment in the following respects, but are basically the same as the first embodiment in all other respects.

Figure 7:
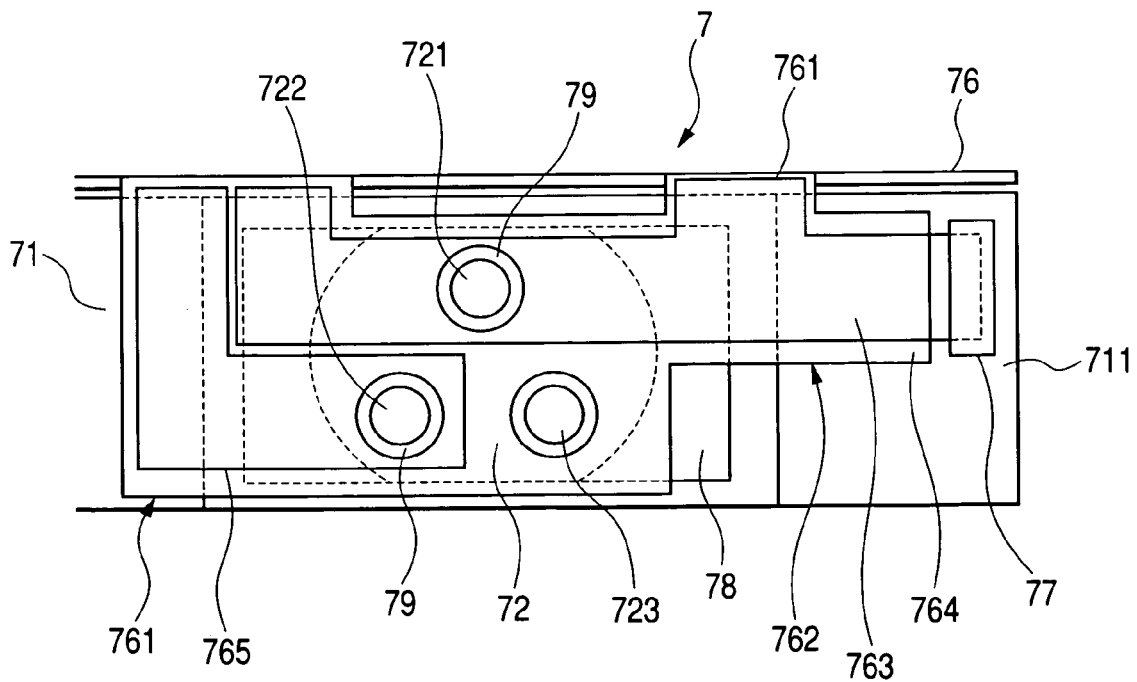
FIG. 7 is a front view of the semiconductor laser unit of the optical pickup device of an optical disk device, which is a second embodiment of the invention.

In the second embodiment shown in FIG. 7, the wiring pattern 763 of the heat conducting flexible substrate 762 which connects the grounding terminal 721 of the semiconductor laser 72 and the pickup case body 711 is branched in a plurality of directions, and connected to the pickup case body 711 in a plurality of positions.

Since this arrangement enables the heat emitted from the semiconductor laser 72 to be diffused extensively, the efficiency of conducting the heat from the semiconductor laser 72 can be further enhanced, and the temperature of the semiconductor laser 72 can be kept even lower. Further in an optical disk device using the optical pickup device 7 of this second embodiment, the temperature of the semiconductor laser can be kept low even if the output of the semiconductor laser 72 is increased. Therefore, the device can meet the high laser output requirement of recording on an optical disk and the requirement for high speed recording.

Figure 8:
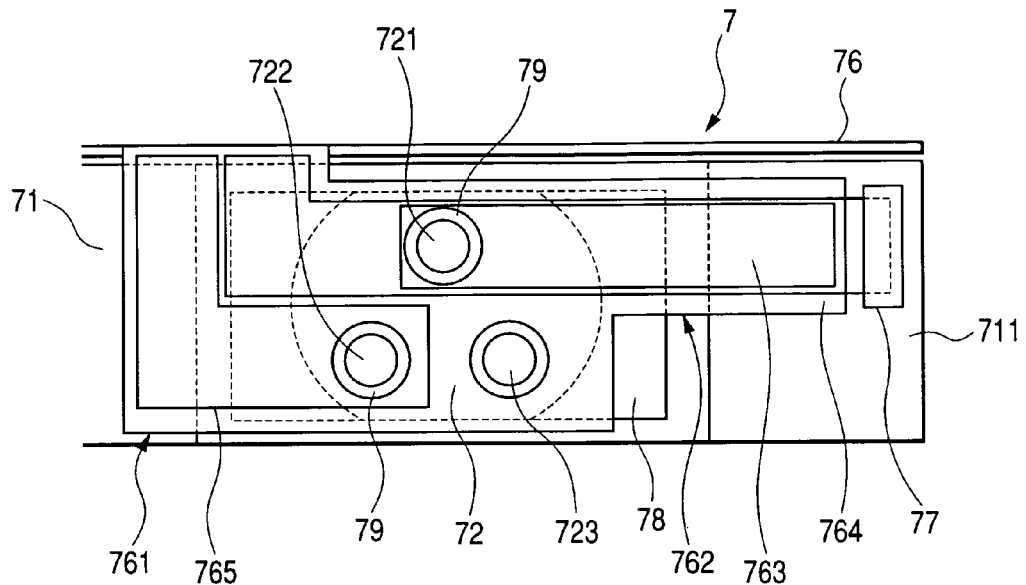
FIG. 8 is a front view of the semiconductor laser unit of the optical pickup device of an optical disk device, which is a third embodiment of the invention.

In the third embodiment shown in FIG. 8, the wiring pattern 763 of the heat conducting flexible substrate 762 which connects the grounding terminal 721 of the semiconductor laser 72 and the pickup case body 711 is multilayered. One side of that multilayered wiring pattern 763 is thermally connected to the semiconductor laser 72, and the other side is thermally connected to the pickup case body 711.

As this arrangement serves to expand the sectional area of the wiring pattern 763, whose thermal conductivity is a few hundred W/m/K, on the heat conducting route from the semiconductor laser 72 to the pickup case body 711, the heat transfer from the semiconductor laser 72 to the pickup case body 711 can be increased, enabling the temperature of the semiconductor laser 72 to be kept low, the flexibility of the wiring pattern 763 to be increased and the load of the heat conducting flexible substrate 762 working on the semiconductor laser 72 to be reduced.

Further, in an optical disk device using the optical pickup device 7 of this third embodiment, the temperature of the semiconductor laser can be kept low even if the output of the semiconductor laser 72 is raised. Therefore, the device can meet the high laser output requirement of recording on an optical disk and the requirement for high speed recording.

Figure 9:
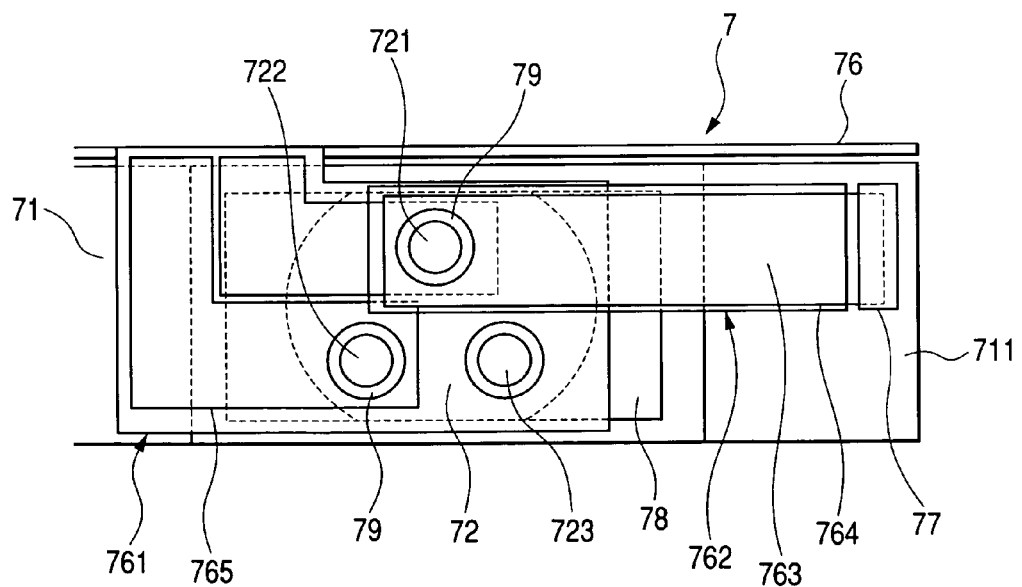
FIG. 9 is a front view of the semiconductor laser unit of the optical pickup device of an optical disk device, which is a fourth embodiment of the invention.

In the fourth embodiment shown in FIG. 9, the wiring pattern 763 of the heat conducting flexible substrate 762 which connects the grounding terminal 721 of the semiconductor laser 72 and the pickup case body 711 is configured of a separate member.

Since this arrangement enables the sectional area and the width of the wiring pattern, whose thermal conductivity is a few hundred W/m/K, can be sufficiently secured for conducting the heat of the semiconductor laser 72 without relying on any other wiring pattern, the temperature of the semiconductor laser 72 can be kept lower. Further in an optical disk device using the optical pickup device 7 of this fourth embodiment, the temperature of the semiconductor laser can be kept low even if the output of the semiconductor laser 72 is raised. Therefore, the device can meet the high laser output requirement of recording on an optical disk and the requirement for high speed recording.

Figure 10:
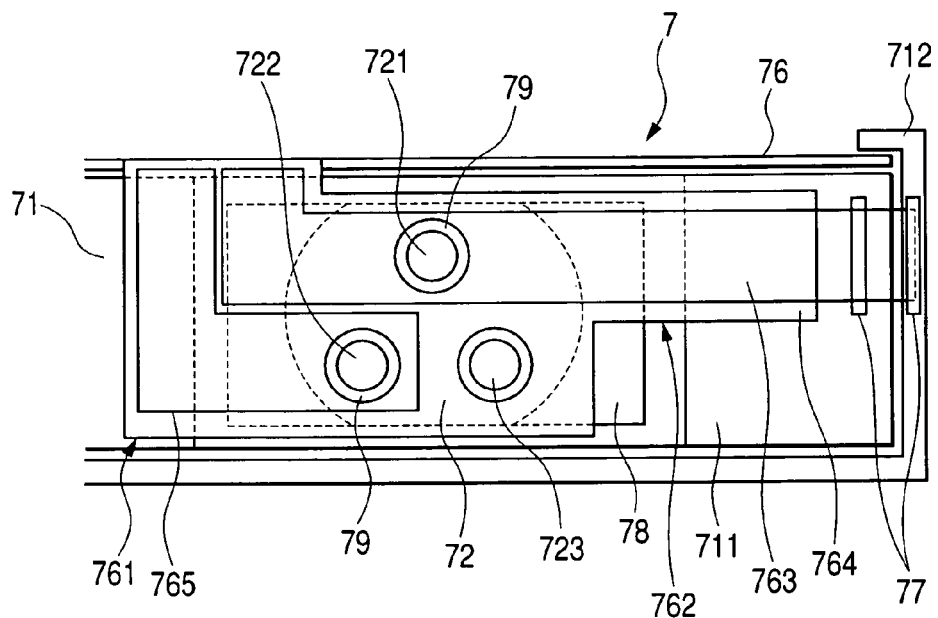
FIG. 10 is a front view of the semiconductor laser unit of the optical pickup device of an optical disk device, which is a fifth embodiment of the invention.

In the fifth embodiment shown in FIG. 10, the wiring pattern 763 is also connected to a metallic pick up case body 712 shielding the top and bottom faces of the pickup case body 711 to maintain both thermal conductivity and electrical conductivity.

As this arrangement enables the heat conducted from the semiconductor laser 72 to be diffused not only to the pickup case body 711 but also to a plurality of metallic members, the temperature of the semiconductor laser 72 can be kept even lower. Further, in an optical disk device using the optical pickup device 7 of this fifth embodiment, the temperature of the semiconductor laser can be kept low even if the output of the semiconductor laser 72 is raised. Therefore, the device can meet the high laser output requirement of recording on an optical disk and the requirement for high speed recording.

Figure 11:
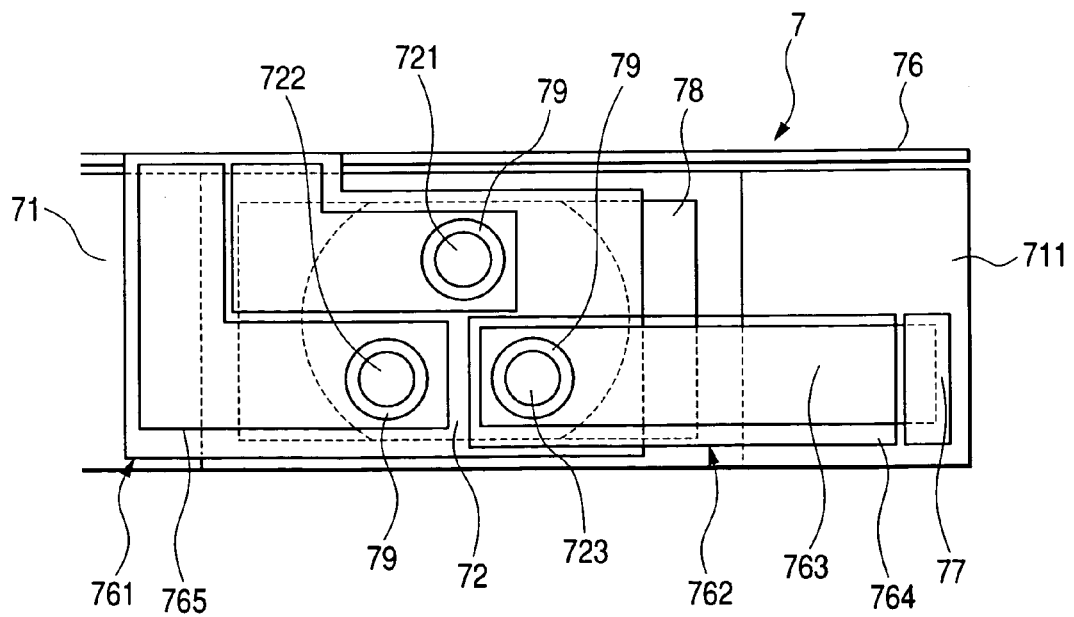
FIG. 11 is a front view of the semiconductor laser unit of the optical pickup device of an optical disk device, which is a sixth embodiment of the invention.

In the sixth embodiment shown in FIG. 11, the wiring pattern 763 of the heat conducting flexible substrate 762 is connected to the other terminal 723, which is a terminal other than the plus terminal 722 for supplying a current to the semiconductor laser 72, instead of the grounding terminal 721 of the semiconductor laser 72.

As this arrangement serves to increase the heat transfer between the semiconductor laser 72 and the wiring pattern 763 of the heat conducting flexible substrate 762, the temperature of the semiconductor laser can be kept even lower.

Therefore, the device can meet the high laser output requirement of recording on an optical disk and the requirement for high speed recording.

Figure 12:
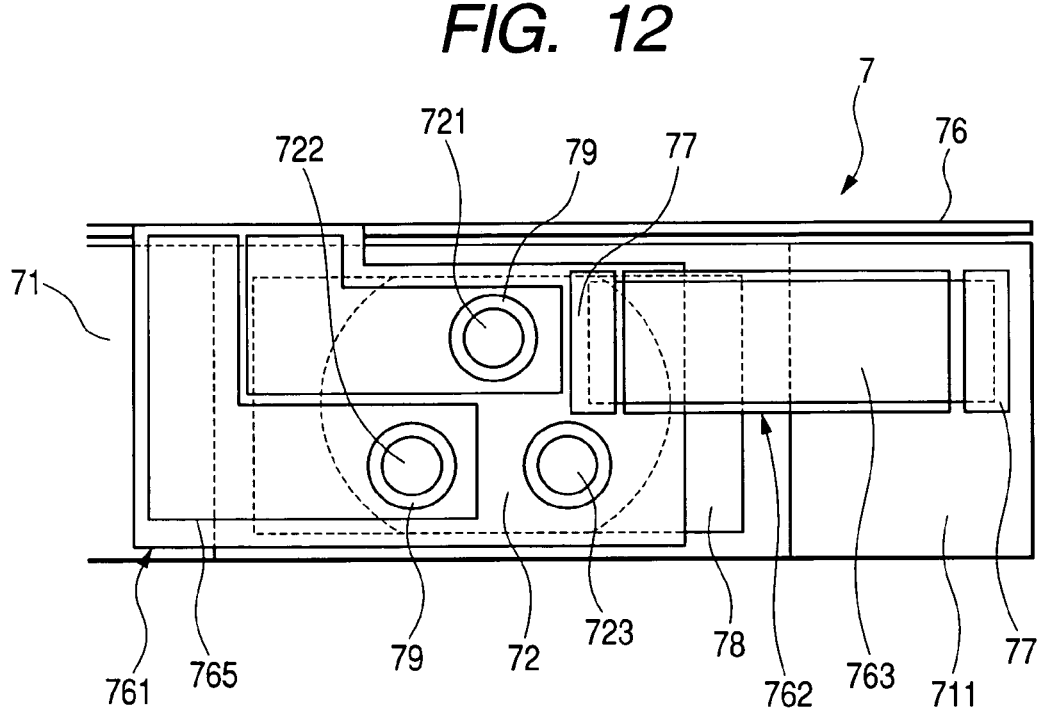
FIG. 12 is a front view of the semiconductor laser unit of the optical pickup device of an optical disk device, which is a seventh embodiment of the invention.

In the seventh embodiment shown in FIG. 12, part of the package of the semiconductor laser 72 and the wiring pattern 763 of the heat conducting flexible substrate 762 are thermo-conductively connected via the electroconductive member 77. As this arrangement enables the heat transfer between the semiconductor laser 72 and the wiring pattern 763 of the heat conducting flexible substrate 762, the temperature of the semiconductor laser can be kept even lower. Therefore, the device can meet the high laser output requirement of recording on an optical disk and the requirement for high speed recording.

Figure 13:
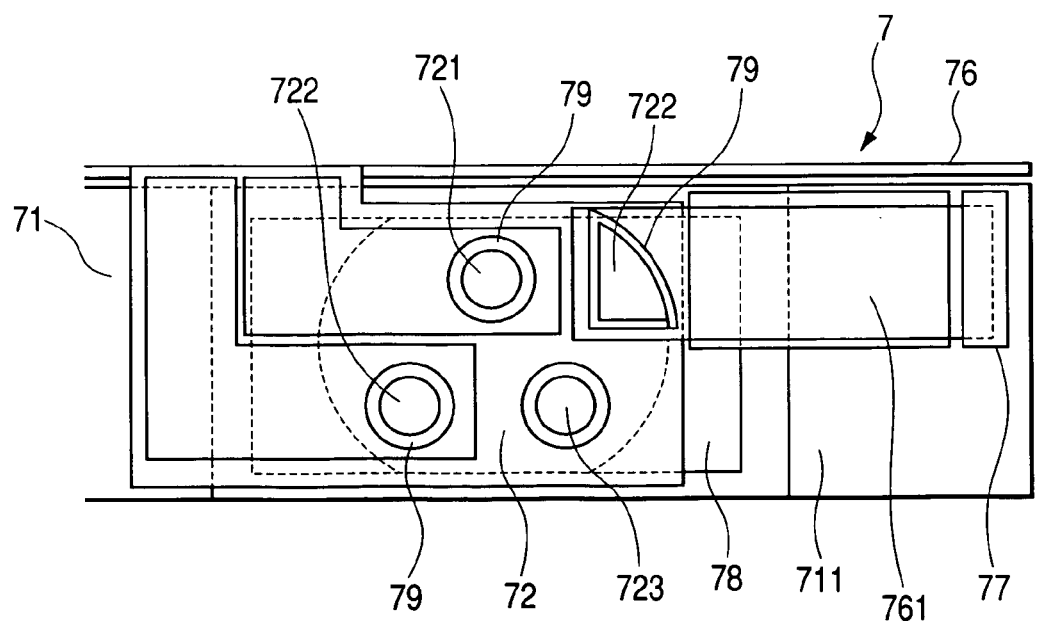
FIG. 13 is a front view of the semiconductor laser unit of the optical pickup device of an optical disk device, which is an eighth embodiment of the invention.

In the eighth embodiment shown in FIG. 13, a stub 722 is disposed in part of the package of the semiconductor laser 72, and that stub 722 and the wiring pattern 763 of the heat conducting flexible substrate 762 are thermo-conductively connected via the solder 79. As this arrangement serves to increase the heat transfer between the semiconductor laser 72 and the wiring pattern 763 of the heat conducting flexible substrate 762, the temperature of the semiconductor laser can be kept even lower. Therefore, the device can meet the high laser output requirement of recording on an optical disk and the requirement for high speed recording.

Figure 14:
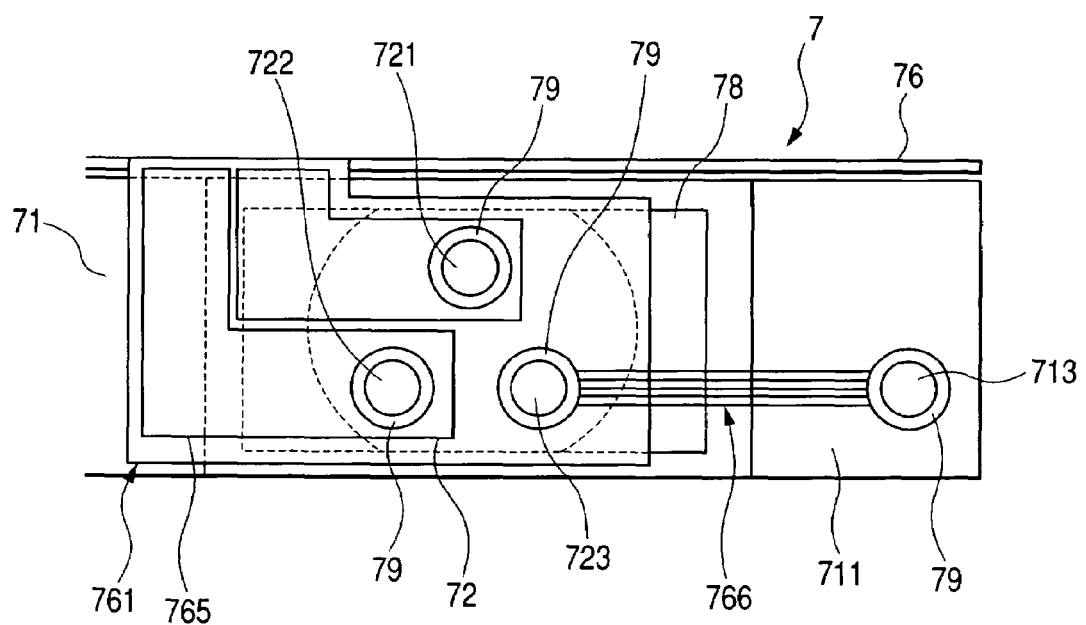
FIG. 14 is a front view of the semiconductor laser unit of the optical pickup device of an optical disk device, which is a ninth embodiment of the invention.

In the ninth embodiment shown in FIG. 14, a heat conducting flexible member 766, consisting of a plurality of wires, is used instead of the heat conducting flexible substrate 762. This heat conducting flexible member 766 has metallic rings at its two ends, and these rings are snapped onto the other terminal 723 of the semiconductor laser 72 and a stub 713 of the pickup case body 711 to thermo-conductively connect these rings to the other terminal 723 and the stub 713 by the solder 79. As this configuration enables not only the sectional area of heat conduction with the inexpensive wires to be expanded but also the flexibility of the heat conducting flexible member 766 formed of the wires to be increased, the temperature of the semiconductor laser can be kept even lower. Therefore, the device can meet the high laser output requirement of recording on an optical disk and the requirement for high speed recording.

What is claimed is:

1. An optical pickup device comprising:
a semiconductor laser for emitting a laser beam for playing back or recording information from or onto an optical disk;
a laser drive circuit, comprising a laser drive IC, for controlling the driving of said semiconductor laser;
a metallic pickup case to be mounted with said semiconductor laser and said laser drive circuit;
a signal transmitting flexible substrate for transmitting signals and the like from said laser drive circuit to said semiconductor laser; and
a heat conducting flexible member for thermo-conductively connecting said semiconductor laser and said metallic pickup case,
wherein said semiconductor laser and said laser drive circuit are mounted on said metallic pickup case, arranged close to each other and connected via said signal transmitting flexible substrate,
wherein said heat conducting flexible member is formed of a heat conducting flexible substrate extending from said signal transmitting flexible substrate in a direction away from said laser drive circuit and thermally connected to said metallic pickup case by way of a wiring pattern of said heat conducting flexible substrate,
said wiring pattern of said heat conducting flexible substrate being thermally separated from a wiring pattern of said signal transmitting flexible substrate.

2. The optical pickup device according to claim 1, wherein, the length, width and thickness of the wiring pattern of said heat conducting flexible substrate being respectively represented by L, w and t; the area of its contact with said pickup case by S, the thermal conductivity of said heat conducting flexible substrate by $\lambda$; the heat transfer coefficient on the surface of said heat conducting flexible substrate by h; the temperature of the grounding terminal of said semiconductor laser by $T_o$; the temperature at the connecting point between the wiring pattern of said heat conducting flexible substrate and said pickup case by $T_1$; the ambient air temperature of the optical pickup device by $T_a$; and the ratio of the difference between the temperature $T_o$ and the temperature $T_1$ to the difference between the temperature $T_o$ and the temperature $T_a$ by k, the length L of said wiring pattern is within the range expressed by the following Formula (1):

$$\frac{\left[1 + \frac{kS}{d}\sqrt{\frac{\lambda}{2hwt(w+t)}}\tanh\left[L\sqrt{\frac{2h(w+t)}{\lambda wt}}\right]\right]\tanh\left[L\sqrt{\frac{2h(w+t)}{\lambda wt}}\right]}{\tanh\left[L\sqrt{\frac{2h(w+t)}{\lambda wt}}\right] + \frac{kS}{d}\sqrt{\frac{\lambda}{2hwt(w+t)}}} \leq 0.5.$$

[Formula 1]

3. An optical pickup device according to claim 1, wherein the wiring pattern of said heat conducting flexible substrate is formed in multiple layers, one side of the multilayered wiring patterns being thermally connected to said semiconductor laser and the other side of the multilayered wiring patterns being thermally connected to said pickup case.

4. An optical pickup device according to claim 1, wherein said heat conducting flexible member is formed of a heat conducting flexible substrate extending from a grounding terminal of said semiconductor laser, wherein said heat conducting flexible substrate is branched into a plurality of parts, and the branched parts are thermally connected to different positions in the pickup case.

* * * * *